(12) United States Patent
Falk

(10) Patent No.: US 9,508,051 B2
(45) Date of Patent: Nov. 29, 2016

(54) BUSINESS DEVELOPMENT CONFIGURATION

(71) Applicant: BMC Software, Inc., Houston, TX (US)

(72) Inventor: Karl-Anders Falk, Linköping (SE)

(73) Assignee: BMC SOFTWARE, INC., Houston, TX (US)

( * ) Notice: Subject to any disclaimer, the term of this patent is extended or adjusted under 35 U.S.C. 154(b) by 451 days.

(21) Appl. No.: 13/838,605

(22) Filed: Mar. 15, 2013

(65) Prior Publication Data

US 2014/0278818 A1    Sep. 18, 2014

(51) Int. Cl.
  *G06Q 10/00* (2012.01)
  *G06Q 10/06* (2012.01)

(52) U.S. Cl.
  CPC ............................... *G06Q 10/06375* (2013.01)

(58) Field of Classification Search
  CPC .............. G06F 1/00–21/00; G06N 3/00–7/00; G06N 99/00; G06Q 10/00–50/00; G06Q 90/00; G06Q 99/00; H04L 1/00–69/00; H04N 1/00–21/00
  USPC ................................................ 705/7.11–7.42
  See application file for complete search history.

(56) References Cited

U.S. PATENT DOCUMENTS

| | | | | |
|---|---|---|---|---|
| 6,164,973 A * | 12/2000 | Macri | ................. | G09B 19/0038 345/156 |
| 6,236,955 B1 * | 5/2001 | Summers | ............... | G06Q 10/10 434/107 |
| 6,280,323 B1 * | 8/2001 | Yamazaki | ............. | A63F 13/005 463/31 |
| 7,073,164 B1 * | 7/2006 | Knowles | ................... | G06F 8/10 717/102 |
| 7,130,779 B2 * | 10/2006 | Beverina et al. | ................. | 703/6 |
| 7,213,232 B1 * | 5/2007 | Knowles | .............. | G06Q 10/087 717/121 |
| 7,349,838 B2 * | 3/2008 | Summers | ............... | G06Q 10/10 434/107 |
| 7,702,638 B2 * | 4/2010 | Tsyganskiy et al. | ...... | 707/999.1 |
| 7,752,027 B2 * | 7/2010 | Cutts | ....................... | G06F 9/455 703/22 |
| 7,761,478 B2 * | 7/2010 | Akkiraju et al. | ............. | 707/794 |
| 7,908,161 B2 * | 3/2011 | Benayon et al. | ............ | 705/7.11 |
| 8,046,441 B2 * | 10/2011 | Banerji | .................. | G06Q 30/06 709/220 |
| 8,180,623 B2 * | 5/2012 | Lendermann et al. | ......... | 703/22 |
| 8,370,794 B2 * | 2/2013 | Moosmann | ............... | G06F 8/10 717/101 |
| 8,838,468 B2 * | 9/2014 | Kano et al. | ................... | 705/7.37 |
| 2002/0103869 A1 * | 8/2002 | Goatly | .................... | G06Q 10/10 709/206 |
| 2002/0169658 A1 * | 11/2002 | Adler | ............................. | 705/10 |

(Continued)

OTHER PUBLICATIONS

Scheer, August-Wilhelm, and Markus Nüttgens. "ARIS architecture and reference models for business process management." Business Process Management. Springer Berlin Heidelberg, 2000. 376-389.*

(Continued)

*Primary Examiner* — Alan S Miller
(74) *Attorney, Agent, or Firm* — Brake Hughes Bellermann LLP

(57) ABSTRACT

In accordance with aspects of the disclosure, systems and methods are provided for configuring business development software for a modeled business environment including simulating one or more business related scenarios for managing situational events encountered with the modeled business environment using scenario input data to thereby generate data related to simulation results, and applying the data related to the simulation results to the modeled business environment to refine the modeled business environment by reconfiguring the business development software for the refined modeled business environment based on the data related to the simulation results provided by simulating the one or more business related scenarios with the scenario input data for the modeled business environment.

20 Claims, 7 Drawing Sheets

(56) References Cited

U.S. PATENT DOCUMENTS

| | | | |
|---|---|---|---|
| 2003/0046123 A1* | 3/2003 | Chen | 705/7 |
| 2003/0233273 A1* | 12/2003 | Jin | G06Q 10/06 706/45 |
| 2004/0015813 A1* | 1/2004 | Yerushalmy | G09B 7/02 717/100 |
| 2004/0044557 A1* | 3/2004 | Frech | G09B 19/18 434/219 |
| 2004/0102940 A1* | 5/2004 | Lendermann | G06F 17/5009 703/6 |
| 2004/0181442 A1* | 9/2004 | Hensel et al. | 705/7 |
| 2005/0004789 A1* | 1/2005 | Summers | G06Q 10/10 703/22 |
| 2005/0004825 A1* | 1/2005 | Ehrler | G06Q 10/063118 705/7.17 |
| 2005/0091093 A1* | 4/2005 | Bhaskaran et al. | 705/7 |
| 2005/0165822 A1* | 7/2005 | Yeung et al. | 707/102 |
| 2006/0074736 A1* | 4/2006 | Shukla | G06Q 10/06 717/100 |
| 2006/0155562 A1* | 7/2006 | Kano et al. | 705/1 |
| 2006/0167704 A1* | 7/2006 | Nicholls | G06Q 10/06393 705/7.39 |
| 2006/0242170 A1* | 10/2006 | Tsyganskiy et al. | 707/100 |
| 2006/0242172 A1* | 10/2006 | Tsyganskiy et al. | 707/100 |
| 2007/0083421 A1* | 4/2007 | McNair et al. | 705/10 |
| 2007/0118551 A1* | 5/2007 | Akkiraju | G06Q 10/06 |
| 2007/0134639 A1* | 6/2007 | Sada | G09B 7/00 434/323 |
| 2007/0156421 A1* | 7/2007 | Klapper | 705/1 |
| 2007/0239858 A1* | 10/2007 | Banerji | G06Q 30/06 709/220 |
| 2008/0040704 A1* | 2/2008 | Khodabandehloo | G06F 8/73 717/105 |
| 2008/0083023 A1* | 4/2008 | Kumar H S | G06Q 10/02 726/6 |
| 2008/0126053 A1* | 5/2008 | Cutts | G06F 9/455 703/13 |
| 2008/0208660 A1* | 8/2008 | Kano et al. | 705/7 |
| 2008/0244064 A1* | 10/2008 | Yeung | H04L 41/5038 709/224 |
| 2009/0018879 A1* | 1/2009 | Flaxer et al. | 705/7 |
| 2009/0112663 A1* | 4/2009 | Benayon et al. | 705/7 |
| 2009/0123895 A1* | 5/2009 | Hill | G09B 19/00 434/219 |
| 2009/0171720 A1* | 7/2009 | Crook | G06Q 10/04 705/35 |
| 2009/0192867 A1* | 7/2009 | Farooq et al. | 705/10 |
| 2009/0226874 A1* | 9/2009 | Bonasso | G06F 8/10 434/365 |
| 2009/0228426 A1* | 9/2009 | Bonasso | G06N 99/005 706/60 |
| 2010/0082696 A1* | 4/2010 | Cao et al. | 707/802 |
| 2010/0083374 A1* | 4/2010 | Schmitlin | G06Q 10/10 726/21 |
| 2010/0115445 A1* | 5/2010 | Jambor-Sadeghi | 715/771 |
| 2011/0055108 A1* | 3/2011 | Galeteanu | G06Q 10/067 705/348 |
| 2011/0088011 A1* | 4/2011 | Ouali | G06F 8/10 717/105 |
| 2013/0117064 A1* | 5/2013 | Sadeghi et al. | 705/7.27 |
| 2013/0159063 A1* | 6/2013 | Fessler | G06Q 10/0631 705/7.36 |
| 2013/0171593 A1* | 7/2013 | Gorman | G09B 5/00 434/219 |
| 2013/0332587 A1* | 12/2013 | Maya | G06Q 10/10 709/223 |
| 2013/0337909 A1* | 12/2013 | Pattison | A63F 13/00 463/29 |
| 2014/0051506 A1* | 2/2014 | Ameling | G06Q 99/00 463/29 |
| 2014/0157170 A1* | 6/2014 | Elias | 715/771 |
| 2014/0196001 A1* | 7/2014 | Ioannou | G06Q 10/06 717/104 |
| 2014/0358646 A1* | 12/2014 | Said | G06Q 10/06398 705/7.42 |

OTHER PUBLICATIONS

Jansen-Vullers, Monique, and Mariska Netjes. "Business process simulation—a tool survey." Workshop and Tutorial on Practical Use of Coloured Petri Nets and the CPN Tools, Aarhus, Denmark. vol. 38. 2006.*

Calheiros, Rodrigo N., et al. "CloudSim: a toolkit for modeling and simulation of cloud computing environments and evaluation of resource provisioning algorithms." Software: Practice and Experience 41.1 (2011):23-50.*

Guo, Chang-Jie, et al. "Study of software as a service support platform for small and medium businesses." New Frontiers in Information and Software as Services. Springer Berlin Heidelberg, 2011. 1-30.*

* cited by examiner

BUSINESS DEVELOPMENT CONFIGURATION

TECHNICAL FIELD

The present description relates to business development configuration.

BACKGROUND

When developing businesses, socializing clients to a business organization can sometimes take several months. Typically, a large portion of time can be spent in onsite workshops with consultants and managers. The workshop can be used to teach client staff how socialization works and how to collect data for the client's business organization and processes. The workshop can also be used to ensure that the consultants understand the client's business organization and processes. At the end of the workshops, the client can be provided with a collection of performance data to verify and correct as necessary, which in some cases can take several weeks or sometimes months to verify and correct. Sometimes, follow up workshops may be needed to align data to related functionality and operations. The cost of this socialization can be high, and a large part of the cost can be related to consultants and client staff not understanding each other. As such, there exists a need to improve business development processes and techniques for socializing clients to a business organization.

SUMMARY

In accordance with aspects of the disclosure, a computer system may be provided for business development configuration including instructions stored on a non-transitory computer-readable medium and executable by at least one processor. The system may include an adaptation engine configured to cause the at least one processor to adapt (or configure) business development software for a modeled business environment based on simulation results generated by simulating one or more business related scenarios with scenario input data for the modeled business environment. The adaptation engine may include an input module configured to acquire the scenario input data from one or more sources. The scenario input data may include parameter related data specific to the business development software provided for adaptation. The adaptation engine may include a simulation module configured to simulate the one or more business related scenarios for managing situational events encountered with the modeled business environment using the scenario input data to thereby generate data related to the simulation results. The adaptation engine may include an application module configured to apply the data related to the simulation results to the modeled business environment to refine the modeled business environment by adapting (or configuring) the business development software for the refined modeled business environment based on the data related to the simulation results provided by simulating the one or more business related scenarios with the scenario input data for the modeled business environment.

In accordance with aspects of the disclosure, a computer-implemented method may be provided for business development configuration. In an implementation, the method may include adapting (or configuring) business development software for a modeled business environment based on simulation results generated by simulating one or more business related scenarios with scenario input data for the modeled business environment, including acquiring the scenario input data from one or more sources, the scenario input data including parameter related data specific to the business development software provided for adaptation, simulating the one or more business related scenarios for managing situational events encountered with the modeled business environment using the scenario input data to thereby generate data related to the simulation results, and applying the data related to the simulation results to the modeled business environment to refine the modeled business environment by adapting (or configuring) the business development software for the refined modeled business environment based on the data related to the simulation results provided by simulating the one or more business related scenarios with the scenario input data for the modeled business environment.

In accordance with aspects of the disclosure, a computer program product may be provided, wherein the computer program product is tangibly embodied on a computer-readable storage medium and includes instructions that, when executed by at least one processor, may be configured to adapt (or configure) business development software for a modeled business environment based on simulation results generated by simulating one or more business related scenarios with scenario input data for the modeled business environment, including acquiring the scenario input data from one or more sources, the scenario input data including parameter related data specific to the business development software provided for adaptation, simulating the one or more business related scenarios for managing situational events encountered with the modeled business environment using the scenario input data to thereby generate data related to the simulation results, and applying the data related to the simulation results to the modeled business environment to refine the modeled business environment by adapting (or configuring) the business development software for the refined modeled business environment based on the data related to the simulation results provided by simulating the one or more business related scenarios with the scenario input data for the modeled business environment.

The details of one or more implementations are set forth in the accompanying drawings and the description below. Other features will be apparent from the description and drawings, and from the claims.

DETAILED DESCRIPTION

Figure 1:
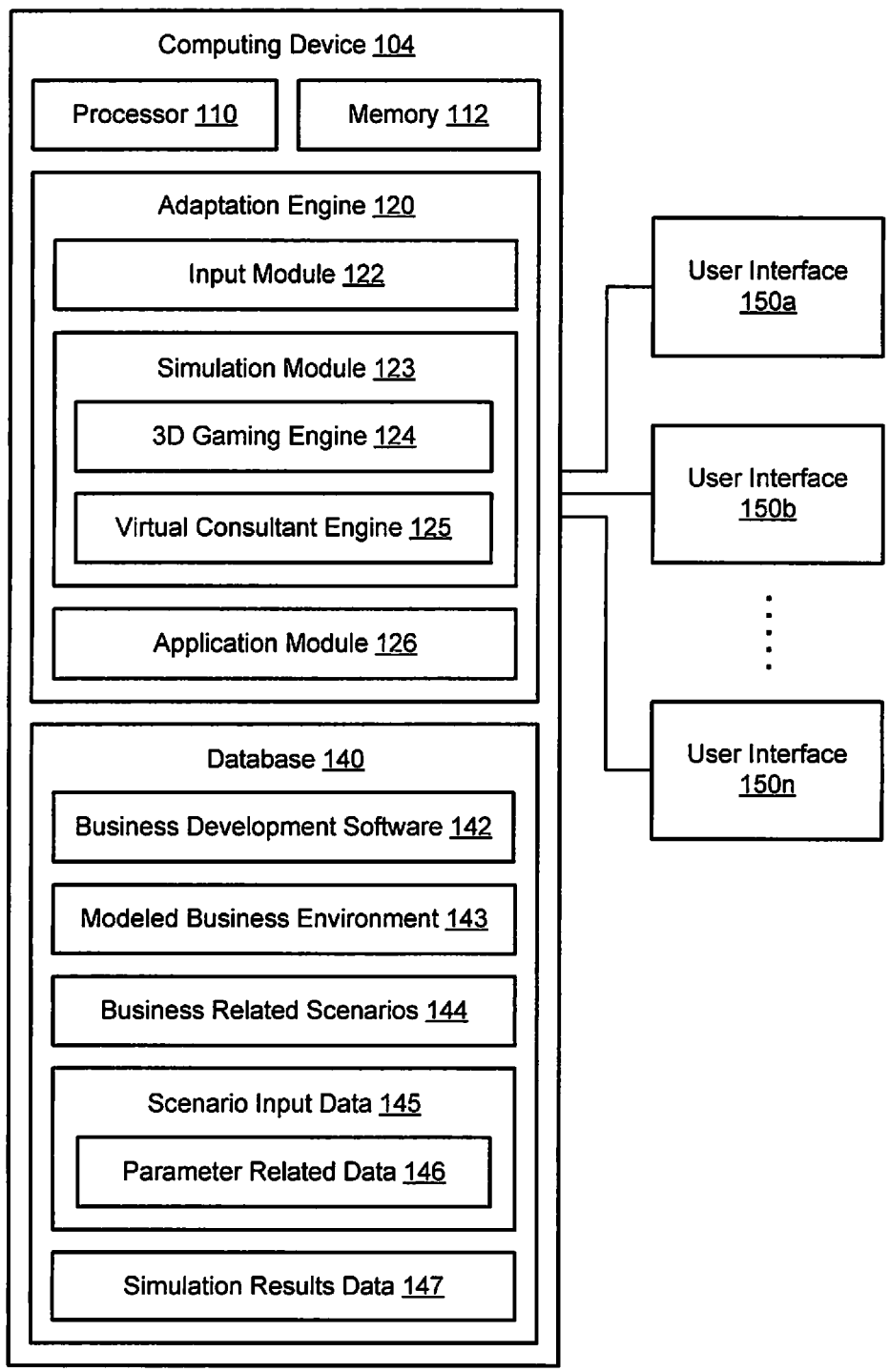
FIG. 1 is a block diagram illustrating an example system for business development configuration, in accordance with aspects of the disclosure.

In various implementations, aspects of the disclosure provide a system and methods for adapting/configuring business development software for a modeled business environment including simulating one or more business related scenarios for managing various situational events encountered with the modeled business environment using scenario input data. Further, the system and methods provide for applying data related to simulation results to the modeled business environment to refine the modeled business environment by adapting/configuring/reconfiguring/updating the business development software for the refined modeled business environment based on the data related to the simulation results provided by simulating the one or more business related scenarios with the scenario input data for the modeled business environment.

In an implementation, the system and methods described herein may be configured to provide an online simulation game and/or gaming environment for speedier SaaS (Software as a Service) customer OnBoarding. Generally, SaaS may be referred to as a model for software delivery provided in a cloud computing environment in which software and associated data are hosted on the cloud and may be accessed by users using a user interface, such as an Internet browser. Cloud computing uses computing resources, such as hardware and software, that are delivered as a service over a network, such as the Internet. Further, SaaS may be used as a delivery model for business applications, (e.g., including information technology (IT) maintenance and support, enterprise resource planning (ERP) maintenance and support, capacity requirements planning (CRP) maintenance and support, customer relationship management (CRM) maintenance and support, and/or any other relevant business applications) by outsourcing hardware and software to an SaaS provider. OnBoarding may be referred to as organizational socialization, and OnBoarding may refer to a mechanism by which clients may acquire desirable knowledge, skills, and/or behaviors to develop into and/or become effective organizational members of a business or company. Strategies used in this process include socialization techniques that may lead to positive outcomes for new employees, including managers, administrators, support staff, etc. Further, in another implementation, aspects of the disclosure may be beneficial for an OnPremise model, where the business client hosts and maintains their own software by themselves in their own environment. Thus, as with SaaS, the system and methods described herein may be applied to OnPremise software for adapting/configuring/reconfiguring/updating business development software after each round/iteration of a game/simulation, in a manner as described herein.

In an implementation, the system and methods described herein may be configured to provide online simulation games (including online business simulation games) to assist users (e.g., employees of business clients) with understanding complex business models (e.g., organizational structure and related processes). The system and methods described herein may be configured to create an online version of a simulation game accessible via a network (e.g., the Internet) and use gamification to construct the simulation game so that it through simulation in an iterative fashion leads the player through collection of foundation data and configuration of any Software as a Service (SaaS) offering. Generally, gamification uses game thinking and game mechanics in a non-game context to engage users and solve problems in a user engagement and learning environment. Through this, a drastic reduction in time and at the same improved quality of OnBoarding may be achieved.

FIG. 1 is a block diagram illustrating an example system 100 for business development configuration, in accordance with aspects of the disclosure. In the example of FIG. 1, the system 100 comprises a computer system for implementing a system for business development configuration that may be associated with a computing device 104, thereby transforming the computing device 104 into a special purpose machine designed to implement various business development configuration process(es) and techniques, as described herein. In this sense, the computing device 104 may include any standard computing device and include any standard element(s) and/or component(s), including at least one processor(s) 110, memory 112 (e.g., non-transitory computer-readable storage medium), one or more database(s) 140, power, peripherals, and various other computing element(s) and/or component(s) that may not be specifically shown in the example of FIG. 1. Further, the system 100 may be associated with one or more user interface (UI) devices 150a, 150b, . . . , 150n configured to interact with one or more users for receiving user input and providing user output.

In various examples, each of the UI devices 150a, 150b, . . . , 150n may include a display device, such as, for example, a monitor or other display that may be used to provide a graphical user interface (GUI) to each of the users. In an implementation, the UI devices 150a, 150b, . . . , 150n may be used to receive preferences, parameters, and/or various input data and information from each of the users for implementing and/or using the system 100. As such, various other element(s) and/or component(s) of the system 100 that may be useful or necessary to implement and/or use the system 100 may be added, inserted, and/or included, as would be apparent to one of ordinary skill in the art.

Accordingly, the business development configuration system 100 of FIG. 1 may include the computing device 104 and instructions recorded on the memory 112 (e.g., non-transitory computer-readable medium) and executable by the at least one processor 110. Further, the business development configuration system 100 may include the one or more user interface (UI) devices 150a, 150b, . . . , 150n for receiving input from each of the users and providing output to each of the users.

In various examples, the computing device 104 may be implemented using any appropriate combination of hardware and/or software configured for wired and/or wireless communication over a network. In an example, the computing device 104 may be implemented as server (e.g., a network server) adapted for communication over a network. In another example, the computing device 104 may be implemented as a mobile communication device (e.g., wireless cellular phone) adapted for communication with a network. In other examples, the computing device 104 may be implemented as a personal computer (PC), a personal digital assistant (PDA), a laptop computer, a tablet computer, a notebook computer, and/or various other generally known types of wired and/or wireless computing devices configured for communication with a network. Thus, in various implementations, the computing device 104 may be referred to as a server computing device for a network.

In various examples, the one or more user interface (UI) devices 150a, 150b, . . . , 150n may be implemented using any appropriate combination of hardware and/or software configured for wired and/or wireless communication over a network. In an example, the one or more UI devices 150*a*, 150*b*, . . . , 150*n* may be implemented as a mobile communication device (e.g., wireless cellular phone) adapted for communication with a network. In other examples, the one or more UI devices 150*a*, 150*b*, . . . , 150*n* may be implemented as a PC, a PDA, a laptop computer, a tablet computer, a notebook computer, and/or various other generally known types of wired and/or wireless computing devices configured for communication with a network. Therefore, in various implementations, the one or more UI devices 150*a*, 150*b*, . . . , 150*n* may be referred to as user devices, client devices, and/or customer devices.

In various examples, the computing device 104 and the one or more user interface (UI) devices 150*a*, 150*b*, . . . , 150*n* may be configured to communicate over a network that may be implemented as a single network or a combination of multiple networks. For example, the network may include a wireless telecommunications network (e.g., cellular telephone network) adapted for communication with one or more other communication networks, such as the Internet. In other examples, the network may include the Internet, one or more intranets, landline networks, wireless networks, and/or one or more other appropriate types of communication networks. As such, in various implementations, the computing device 104 and the one or more user interface (UI) devices 150*a*, 150*b*, . . . , 150*n* may be associated with a particular link (e.g., a link, such as a URL (Uniform Resource Locator) to an IP (Internet Protocol) address).

In the example of FIG. 1, the system 100 may include an adaptation engine 120 configured to cause the at least one processor 110 to adapt (e.g., adjust, configure, modify, reconfigure, tailor) business development software 142 for a modeled business environment 143 based on simulation results 147 generated by simulating one or more business related scenarios 144 with scenario input data 145 for the modeled business environment 143. In some examples, the adaptation engine 120 may be referred to as a configuration engine and/or a reconfiguration engine. In various examples, data and information related to the business development software 142, the modeled business environment 143, the business related scenarios 144, the scenario input data 145, and the simulation results 147 may be stored in a database, such as the database 140, which may be internal or external to the computing device 104.

In various examples, the business development software 142 may be configured for a physical business client associated with the modeled business environment 143. The modeled business environment 143 may be configured to define a hierarchical management structure of one or more departments within a physical business client. The modeled business environment 143 may be configured to define an internal organizational structure of a physical business client, and the modeled business environment 143 may be set to one or more process environments associated with the internal organizational structure of the physical business client. The business development software may be tailored to fit a specific physical business client.

In various examples, the adaptation engine 120 may be configured to cause the at least one processor 110 to iteratively adapt (e.g., adjust, configure, modify, reconfigure, tailor) the business development software 142 for the modeled business environment 143 based on the simulation results 147 generated by iteratively simulating a plurality of business related scenarios 144 with the scenario input data 145 and the data related to the simulation results 147 for the modeled business environment 143. For instance, the adaptation engine 120 may be configured to iteratively cycle and/or recycle through the simulation process one or more times to further refine the modeled business environment 143 and to further discover data (including data related to simulation results) for each round of cycling and/or recycling.

In an implementation, the adaptation engine 120 may include an input module 122 configured to acquire (e.g., obtain, receive, retrieve) the scenario input data 145 from one or more sources, such as, for example, the one or more database 140. The scenario input data 145 may include parameter related data 146 specific to the business development software 142 that may be provided for adaptation (e.g., adjustment, configuration, modification, reconfiguration, tailoring).

In various examples, the scenario input data 145 may include one or more foundation data structures that may define or may be configured to define a business organization and one or more processes associated with the business organization. The parameter related data 146 may be specific to the business development software 142, and the parameter related data 146 may include one or more of scripts, templates, and areas to explore in context of the modeled business environment 143.

In various examples, the input module 122 may be configured to acquire (e.g., obtain, receive, retrieve) the scenario input data 145 from one or more users by interactively involving the one or more users by receiving user interactive input from each of the one or more users and/or providing interactive output to each of the one or more users. For instance, the one or more users may interact with the input module 122 via the one or more user interface (UI) devices 150*a*, 150*b*, . . . , 150*n* for receiving interactive user input and providing interactive user output.

In an implementation, the adaptation engine 120 may include a simulation module 123 configured to simulate the one or more business related scenarios 144 for managing situational events encountered with the modeled business environment 143 using the scenario input data 145 to thereby generate (e.g., discover, obtain, extract) data related to the simulation results 147. For instance, in various examples, the simulation module 123 may be configured to simulate the one or more business related scenarios 144 for the purpose of situational awareness while managing (e.g., analyzing, assessing, evaluating, testing) real-world situational events (e.g., real-world processes, real-world conditions, real-world problems, real-world incidents, etc.) encountered with (and/or during simulation of) the modeled business environment 143 using the scenario input data 145 to thereby generate (e.g., discover, obtain, extract) the data related to simulation results 147 including event responses. The simulation module 123 may be configured to use one or more simulations to collect data and reconfigure the business development software 142. The simulations and the data related to the simulation results 147 may be used for managing behavior of the modeled business environment 143.

In an implementation, the simulation module 123 may include a three-dimensional (3D) gaming engine 124. In various examples, the 3D gaming engine 124 may be configured to provide 3D gaming functionality for user/player interactive simulation experiences and may further provide functionality for multiple users/players to interact with each other and with the adaptation engine 120 before, during, and after each simulation round/iteration.

In accordance with aspects of the disclosure, the 3D gaming engine 124 may include a 3D real-world gaming engine configured to put the users/players of the adaptation engine 120 into a context of the modeled business environment, thus giving the users/players a real-world context for making appropriate business decisions in a context of the modeled business environment rather than in a context of product features. For instance, the 3D gaming engine 124 may be configured to present the users/players with business scenarios in which the business development software is used and adapted to support the modeled business environment. The 3D gaming engine 124 may further include traditional gamification functionality, such as, for example, rating, scoreboards, competition, and game-levels, to keep the users/players engaged during the iterative adaptation of the business development software. The 3D gaming engine 124 operating as a 3D real-world gaming engine may be configured to react on situational events from the users/players input and the simulation module 123, and the 3D real-world gaming engine may lead the users/players toward a better and better modeled business environment resulting in a business development software being better and better adapted to support a real-world business client (e.g., a physical business client). Accordingly, aspects of the disclosure pertain to how to use simulation and 3D gaming software in a unique way to simulate and configure business development software.

In an implementation, the simulation module 123 may include a virtual consultant engine 125. The virtual consultant engine 125 may be an integral part of the 3D gaming engine 124 (e.g., the 3D real-world gaming engine). In various examples, the virtual consultant engine 125 may interact with the users/players before, during, and after a simulation iteration to thereby provide one or more of advice, present business scenarios, enforce business decisions, highlight key performance indicators (KPIs) that may have improved based on previous business decisions, highlight potential areas where further improvements may be achieved (which may be used by a vendor of the business development software to up-sell additional functionality), respond to questions on request from the users/players, provide guidance to the users/players, and encourage/inspire the users/players to make various improvements (which may be presented as KPIs in charts, scoreboards, game levels, etc.). Further, in various examples, depending on a selected role of the user/player, business scenarios, game rules, decisions, advice, guidance, and/or KPIs related to the selected role may be presented to the user/player by the 3D real-world gaming engine and the virtual consultant.

In various examples, the simulation module 123 may be configured to simulate the one or more business related scenarios 144 to discover areas within the modeled business environment 143 that may indicate a need for improvement. The simulation module 123 may be configured to measure one or more values of the parameter related data 146 during simulation including measuring business related costs associated with the scenario input data 145.

In various examples, the simulation module 123 may be configured to interactively involve one or more users in the simulation by receiving user interactive input for each of the one or more users during simulation of the one or more business related scenarios 144. For instance, the one or more users may interact with the simulation module 123 via the one or more UI devices 150a, 150b, . . . , 150n for receiving interactive user input and providing interactive user output during simulation.

In various examples, managing situational events encountered with the modeled business environment 143 may include managing one or more of problematic events, incident related events, personnel scheduling events, and job routing events that are inserted in the one or more business related scenarios 144 for simulation.

In an implementation, the adaptation engine 120 may include an application module 126126 configured to apply the data related to the simulation results 147 to the modeled business environment 143 to refine refine (e.g., improve, optimize, revise, update) the modeled business environment 143 by adapting (e.g., adjusting, configuring, modifying, reconfiguring, tailoring) the business development software 142 for the refined modeled business environment 143 based on the data related to the simulation results 147 provided by simulating the one or more business related scenarios 144 with the scenario input data 145 for the modeled business environment 143.

In various examples, the application module 126 may be configured to resolve one or more problems associated with the modeled business environment 143 discovered during simulation. In some examples, the application module 126 may be configured to resolve the one or more problems in conjunction with the virtual consultant engine 125 of the simulation module 123. The one or more problems may include one or more discrepancies associated with at least one of the scenario input data 145 and the simulation results 147. The application module 126 may be configured to identify patterns in the data related to the simulation results 147 to refine the modeled business environment 143 by reconfiguring the business development software 142 for a physical business client associated with the modeled business environment 143. The application module 126 may be configured to refine the modeled business environment 143 by updating one or more process environments associated with an internal structure of a physical business client associated with the modeled business environment 143. The application module 126 may be configured to refine the modeled business environment 143 by using the data related to the simulation results 147 to discover improvements to apply to the modeled business environment 143 to thereby adjust the business development software 142 for the refined modeled business environment 143.

In the example of FIG. 1, the business development configuration system 100 is shown using various functional blocks or modules that represent more-or-less discrete functionality. However, such illustration is provided for clarity and convenience, and therefore, various functionalities may overlap or may be combined within a described block(s) or module(s), and/or may be implemented by one or more block(s) or module(s) not shown in the example of FIG. 1. Generally, conventional functionality may be considered useful to the system 100 of FIG. 1 may be included as well even though such conventional elements are not shown explicitly, for sake of clarity and convenience.

Figure 2:
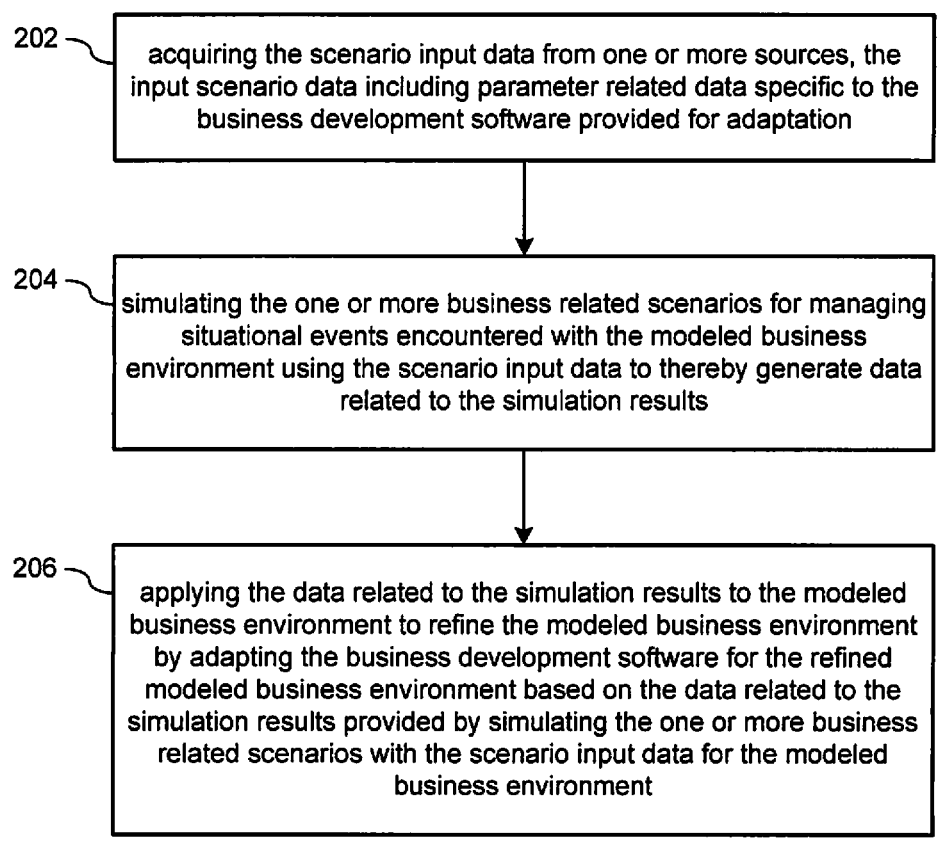
FIG. 2 is a process flow diagram illustrating an example method for business development configuration, in accordance with aspects of the disclosure.

FIG. 2 is a process flow diagram illustrating an example method 200 for business development configuration, in accordance with aspects of the disclosure. In the example of FIG. 2, operations 202-206 are illustrated as a series of discrete operations occurring in sequential order. However, in other implementations, two or more of the operations 202-206 may occur in a partially or completely overlapping or parallel manner, or in a nested or looped manner, or may occur in a different order than that shown. Further, additional operations, that may not be specifically shown in the example of FIG. 2, may be included in some other implementations, while, in still other implementations, one or more of the operations 202-206 may be omitted.

In various other implementations, the method 200 may include a process flow for a computer-implemented method for business development configuration in the system 100 of FIG. 1. Further, as described herein, the operations 202-206 may provide a simplified operational process flow that may be enacted by the computer device 104 to provide features and functionalities as described in reference to FIG. 1.

In the example of FIG. 2, the method 200 may be configured for adapting (e.g., adjusting, configuring, modifying, reconfiguring, tailoring) business development software for a modeled business environment based on simulation results generated by simulating one or more business related scenarios with scenario input data for the modeled business environment. For instance, at 202, the method 200 may include acquiring (e.g., obtaining, receiving, retrieving) the scenario input data from one or more sources. In various examples, the scenario input data may include parameter related data specific to the business development software provided for adaptation (e.g., adjustment, configuration, modification, reconfiguration, tailoring).

At 204, the method 200 may include simulating the one or more business related scenarios for managing situational events encountered with the modeled business environment using the scenario input data to thereby generate data related to the simulation results. In an implementation, the method 200 may include simulating one or more business related scenarios for the purpose of situational awareness while managing (e.g., analyzing, assessing, evaluating, testing) real-world situational events (e.g., real-world processes, real-world conditions, real-world problems, real-world incidents, etc.) encountered with (and/or during simulation of) the modeled business environment using the scenario input data to thereby generate (e.g., discover, obtain, extract) the data related to simulation results including event responses.

At 206, the method 200 may include applying the data related to the simulation results to the modeled business environment to refine (e.g., improve, optimize, revise, update) the modeled business environment by adapting (e.g., adjusting, configuring, modifying, reconfiguring, tailoring) the business development software for the refined modeled business environment based on the data related to the simulation results provided by simulating the one or more business related scenarios with the scenario input data for the modeled business environment.

In various implementations, the method 200 may include providing data and information for, during, and/or after simulation. For example, the method 200 may include providing business development software for a physical business client associated with the modeled business environment. The business development software may be tailored to fit the physical business client. In another example, the method 200 may include providing the modeled business environment to define a hierarchical management structure of one or more departments within a physical business client. In another example, the method 200 may include providing the modeled business environment to define an internal organizational structure of the physical business client. In another example, the method 200 may include providing one or more process environments associated with the internal organizational structure of the physical business client. In another example, the method 200 may include providing scenario input data in a form of one or more foundation data structures that are configured to define a business organization and one or more processes associated with the business organization. In another example, the method 200 may include providing one or more of scripts, templates, and areas to explore in context of the modeled business environment.

In an implementation, the method 200 may include acquiring scenario input data from one or more users by interactively involving the one or more users by receiving user interactive input from each of the one or more users and/or providing interactive output to each of the one or more users. The method 200 may include interactively involving one or more users in the simulation by receiving user interactive input for each of the one or more users and/or providing user interactive output to the one or more users during simulation of the one or more business related scenarios.

In an implementation, the method 200 may include simulating the one or more business related scenarios to discover areas within the modeled business environment that indicate a need for improvement. The method 200 may use the simulations for managing behavior of the modeled business environment. The method 200 may use the simulations to collect data and reconfigure software.

In an implementation, the method 200 may include measuring one or more values of the parameter related data during simulation including measuring business related costs associated with the scenario input data. The method 200 may include managing one or more of problematic events, incident related events, personnel scheduling events, and job routing events that are inserted in the one or more business related scenarios for simulation. The method 200 may include resolving one or more problems associated with the modeled business environment discovered during simulation. The one or more problems may include one or more discrepancies associated with at least one of the scenario input data and the simulation results. The method 200 may include identifying patterns in the data related to the simulation results to refine the modeled business environment by reconfiguring the business development software for a physical business client associated with the modeled business environment.

In an implementation, the method 200 may include refining the modeled business environment by updating one or more process environments associated with an internal structure of a physical business client associated with the modeled business environment. The method 200 may include refining the modeled business environment by using the data related to the simulation results to discover improvements to apply to the modeled business environment to thereby adjust the business development software for the refined modeled business environment.

In an implementation, the method 200 may include iteratively adapting the business development software for the modeled business environment based on simulation results generated by iteratively simulating a plurality of business related scenarios with the scenario input data and the data related to the simulation results for the modeled business environment. For instance, the method 200 may include iteratively cycling and/or recycling through the simulation process one or more times to further refine the modeled business environment 143 and to further discover data (including data related to simulation results) for each round of cycling and/or recycling.

In various implementations, as described herein, the business development configuration may refer to using a gaming environment to adapt/configure/reconfigure business development software for a modeled business environment including simulating business related scenarios for managing various situational events encountered with the modeled business environment. These techniques may provide speedier SaaS (Software as a Service) customer OnBoarding in a cloud computing environment to assist users (e.g., employees of business clients) with understanding business organizational structure and related processes. The system and methods described herein may be configured to create an online version of a simulation game accessible via a network (e.g., the Internet) and use gamification to construct the simulation game so that it through simulation in an iterative fashion leads the player through collection of foundation data and configuration of any Software as a Service (SaaS) offering. Through this, a drastic reduction in time and at the same improved quality of OnBoarding may be achieved.

For instance, in an implementation, when a user signs up for access to a SaaS offering (e.g., on-demand software), the user may receive a Uniform Resource Locator (URL) to the SaaS offering and receive access to a simulation game associated with the SaaS offering. In an online game console via a user interface, the user may be asked for a username along with some personal user information and details about the user and a business or company related to the user. This input of user information may lead to a modeled business or company environment being loaded into the SaaS offering and the simulation game, with a predefined configuration. This configuration may be prebuilt by analyzing one or more pre-existing business clients including any related foundation data and identified patterns for structuring data for modeled business environments.

In various implementations, the business development software may refer to any type of relevant business application, software, and/or service related to, in various examples, information technology (IT), enterprise resource planning (ERP), capacity requirements planning (CRP), customer relationship management (CRM), professional services automation (PSA), IT service management (ITSM), and various manufacturing and/or professional services, etc.

Within the simulation game is a story that makes it fun and engaging to play, so that at the end the player suddenly realized, that while having fun, the on-demand software has been automatically configured and may be started to use, right away. In the simulation game, there are individuals, places, rooms, etc. that the user may visit and interact with, including virtual gurus or virtual consultants that may be consulted when needed, or that may call the user when there are one or more options to select from. The simulation game may further include chat forums, live chat, communities, and social networks, where the user/player may interact with others implementing the on-demand software, and/or experts in implementing the on-demand software. There may also be an option to make the simulation game a sales channel for in-application purchase of one or more additional game-levels (which may release functionality in the simulation game, but may also mature user usage and organizational optimization). The simulation game may include a single player game where the single person may act as an implementer of on-demand software. The simulation game may include a multi-player, where multiple users with different roles in the business or company logs in to the simulation game acting in their own role or other roles, such as a manager, administrator, support staff, etc.

In accordance with aspects of the disclosure, the system and methods described herein may be configured for online simulation games to provide users/players with real-world interactive simulations to thereby assist users/players (e.g., employees of business clients) with comprehending business models (e.g., organizational structures and related processes). Further, the system and methods described herein may be configured to create online versions of simulation games accessible via a network (e.g., the Internet) and use gamification to construct the simulation games so that, through simulation in an iterative fashion, the online simulation games lead the users/players through collections of foundation data and configuration of any SaaS offering. Generally, gamification uses game thinking and game mechanics in a non-game context to engage users and solve problems in a user interactive engagement and learning environment.

Figure 3:
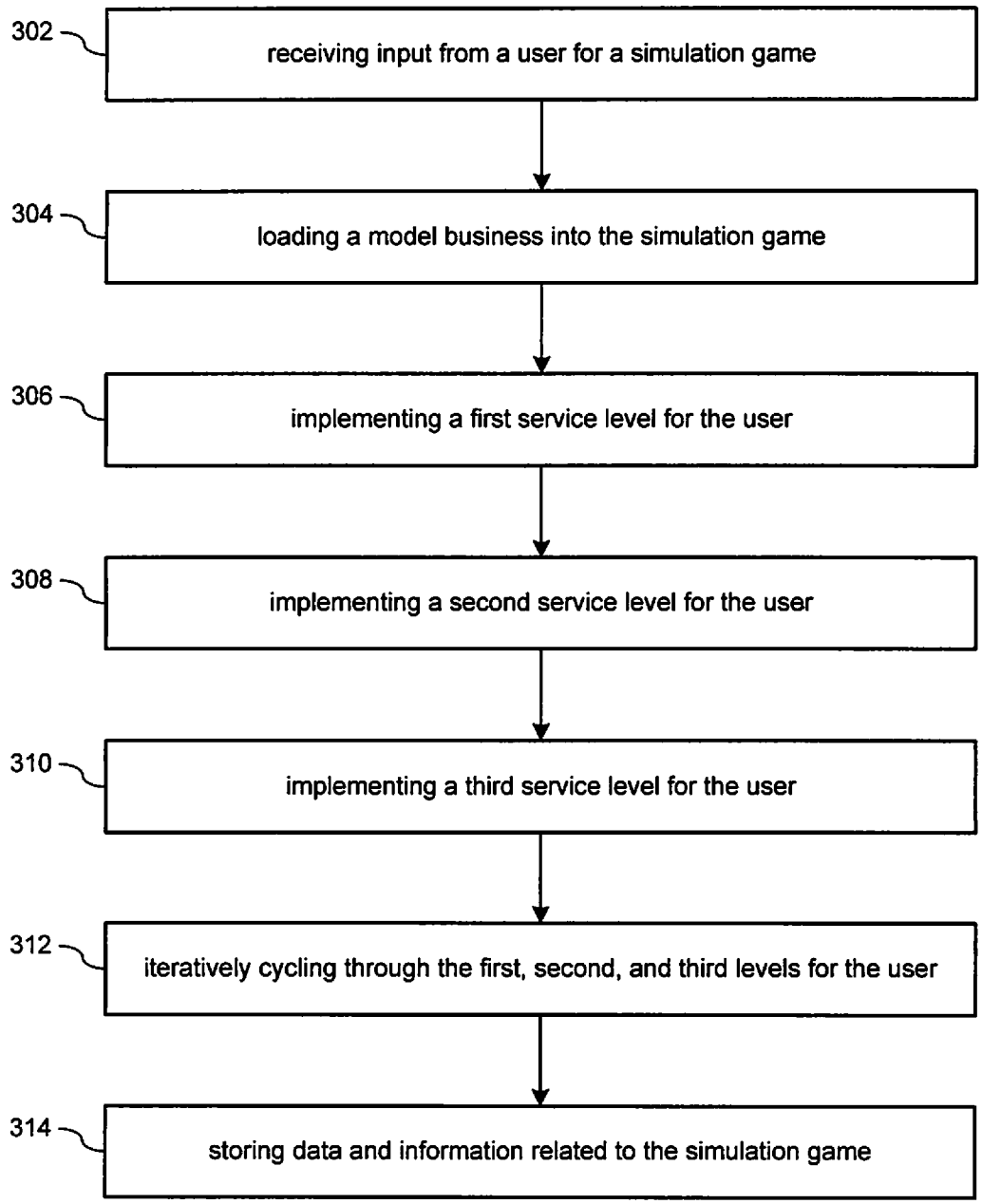
FIG. 3 is another process flow diagram illustrating an example method for business development configuration, in accordance with aspects of the disclosure.

FIG. 3 is a process flow diagram illustrating an example method 300 for business development configuration, in accordance with aspects of the disclosure. In the example of FIG. 3, operations 302-306 are illustrated as a series of discrete operations occurring in sequential order. However, in other implementations, two or more of the operations 302-306 may occur in a partially or completely overlapping or parallel manner, or in a nested or looped manner, or may occur in a different order than that shown. Further, additional operations, that may not be specifically shown in the example of FIG. 3, may be included in some other implementations, while, in still other implementations, one or more of the operations 302-306 may be omitted.

In various other implementations, the method 300 may include a process flow for a computer-implemented method for business development configuration in the system 100 of FIG. 1. Further, as described herein, the operations 302-306 may provide a simplified operational process flow that may be enacted by the computer device 104 to provide features and functionalities as described in reference to FIG. 1.

At 302, the method 300 may include receiving input from a user for a simulation game. For example, a user interface may prompt a user to input user related data and information including a user name, user role, business name, and business description. The user may be a player for the simulation game, and the player may enter name and some personal information about the user and the simulation game.

At 304, the method 300 may include loading a modeled business or company environment into the simulation game. For example, a modeled business environment may be loaded into the simulation game, which may include foundation data and configuration data needed to be able to immediately use on-demand software.

At 306, the method 300 may include implementing a first service level for the user. For example, in the first level of service (Level 1), there may be no service desk in the simulated business, and the user may call the support staff directly because they know them. In this example, only a few request tickets may be registered in the on-demand software, and incidents may be prioritized based on who knows the technician best, so when a major incident occurs (e.g., business outage), the support staff may focus on the few request tickets other than the occurrence of the major incident. Simulation of round 1 may present some statistics, explain the situation, and the virtual consultant may enter in and inform the user/player to establish a service desk in the simulation game.

At 308, the method 300 may include implementing a second service level for the user. For example, in the second level of service (Level 2), the user/player may establish the service desk, and the player may interview a service desk manager and staff and may decide how many people and their skilled level. The user/player may be asked about actual names and details about the service desk staff, which may then be loaded into on-demand software as foundation data. Further, a simulation may be run, and the user/player may be presented with some statistics to show that the support organization improved. In some examples, some parts of simulation and user/player involvement may include competition/excitement/story that may engage the user/player in a game type of atmosphere. The service desk may be configured to resolve one or more issues, and the user/player may decide to train the service desk staff to resolve more incidents, and may also establish a second line of support.

At 310, the method 300 may include implementing a third service level for the user. For example, in the third level of service (Level 3), the user/player may establish a second line of support, and the user/player may be asked to hire people to staff one or more different support teams depending on the loaded business model. The user/player may decide to only staff a few support groups or all in the model. As a result, incidents may be resolved where there is staffed support groups, while other incidents may be queuing up, as there may be no staff to resolve them. Again, the user/player may decide skills levels, training, on-demand software training, etc., which may be given the new staff. In some examples, there may be a financial model included in the simulation game, so that every training and every individual hired may generate a cost, and a budget of the implementation may be calculated.

At 312, the method 300 may include iteratively cycling through the first, second, and third levels for the user. For example, the simulation game may continually cycle though level after level exploring functionality after functionality including the same or different functionalities where a number of levels may be provided with an on-demand product, while one or more additional or new levels may be purchased as in-application purchases. This is may be considered if consultant advice does not make sense or help, and the user/player may decide to request an onsite consultant.

At 314, the method 300 may include storing data and information related to the simulation game at any particular point or position in the simulation game. For instance, at anytime during the simulation game, the user/player may save/store a spread sheet with financial figures, along with diagrams and/or registries listing various actions taken to hire and/or train people in the simulation. There may be one or more options to update the on-demand software configuration, with the collected foundation data and configurations from the simulation game, directly into real world SaaS solutions.

In a business or company model using software as a service (SaaS), users may be provided access to application software and databases where cloud providers may manage infrastructure and platforms on which the application software runs. SaaS may be referred to as on-demand software, and SaaS providers may price applications using a subscription fee. Cloud computing may use computing resources, such as hardware and software, that may be delivered as a service over a network, such as the Internet. End users may access cloud-based applications through user interface while business software and user data may be stored on remote servers. Cloud computing and SaaS on-demand software enables quick application startup for businesses and companies with improved manageability and less maintenance, and further enables businesses and companies to adjust resources to meet fluctuating and unpredictable business demand. Further, cloud computing and SaaS provides for sharing of resources/services to achieve coherence over a network. Gamification makes use of game mechanics in a non-game context to engage users/players and solve problems, and game mechanics may refer to constructs of gaming rules for gameplay. Interaction of game mechanics with game environments and game resources in a simulation game may determine a complexity and level of user/player interaction in the game. Some forms of game mechanics have been used in games for centuries, while others are relatively new, having been invented within the past decade.

The system and methods provided herein may be configured to simulate real-world events or processes designed for a purpose of solving problems and training related to a business or company. In some examples, business simulation games may be configured for simulating real-world systems that allow users/players to experience and evaluate themselves in situations before encountering these simulated situations in the real business world. In some examples, business simulation games may be configured for simulating professional training in actual business environments and study employee behavior, evaluate business models, and research economic outcomes.

Figure 4:
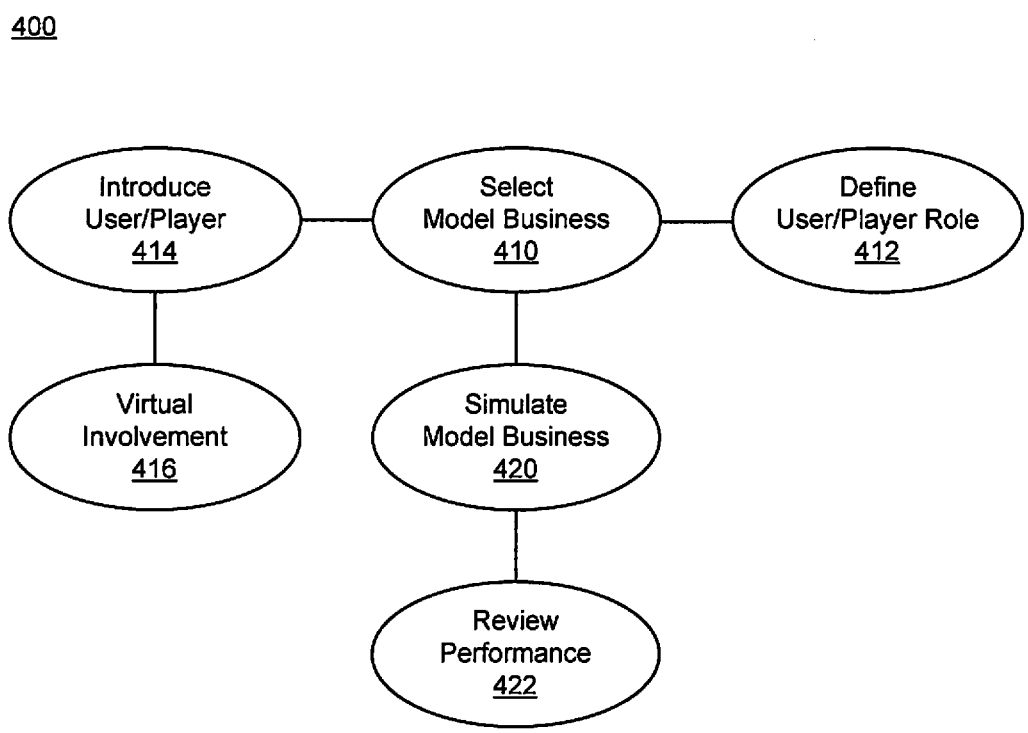
FIG. 4 is a diagram illustrating an example process for business simulation of a modeled business environment, in accordance with aspects of the disclosure.

FIG. 4 is a diagram illustrating an example process 400 for business simulation of a modeled business environment, in accordance with aspects of the disclosure. In various examples, a user/player may interact with a modeled business environment via a user interface to provide data and information and receive data and information relevant to the modeled business environment.

At 410, the process flow 400 may include selecting a modeled business environment and one or more business related scenarios (e.g., IT related scenarios), which may include selecting at least one of a plurality of modeled business environments via a user interface. For example, user input selection may include identifying one or more countries for the selected modeled business environment, filing-in one or more cities as sites, and/or filling-in business calendars for the modeled business environment. In another example, user input selection may include identifying one or more languages used by the selected modeled business environment including configuring language/users for the modeled business environment. In another example, user input selection may include identifying support staff size (e.g., IT support staff size) for the selected modeled business environment including filling-in application services and/or support groups for the modeled business environment. In another example, user input selection may include identifying infrastructure (e.g., IT infrastructure) for the selected modeled business environment including filling-in services and support groups for the modeled business environment. In another example, user input selection may include identifying shifts and work hours for the selected modeled business environment including filling-in support groups and work hours. In another example, user input selection may include identifying an industry for the modeled business environment including filling-in business organization and service request definitions (SRDs), which may refer to a list of questions asked by a requester for a service. The responses to the questions may be needed to fulfill the request, and the SRD may define what questions to ask the requester.

At 412, the process flow 400 may include defining a user/player role in the modeled business environment. For example, the user/player may define his/her own role in the modeled business environment via a user interface, such as a desktop support group manager, a service desk manager, an operation manager, a process office manager, and various other types of managers. The user/player role may include any type of employee status relevant to the modeled business environment.

At 414, the process flow 400 may include introducing the user/player to the modeled business environment. For example, the user/player may be virtually introduced in the modeled business environment in the defined role via a user interface.

At 416, the process flow 400 may include virtually involving the user/player in the modeled business environment. For example, the user/player may be virtually introduced in the modeled business environment by providing the user/player with one or more virtual consultants, live chat, social networking, and/or training via a user interface. In another example, the user/player may be provided with a list of selectable modules via a user interface for virtual consultants, live chat, social networking, and/or training.

At 420, the process flow 400 may include simulating the modeled business environment with one or more simulations via a user interface. In various examples, simulating the modeled business environment with one or more simulations may include an initial simulation and one or more continued simulations and/or repeated simulations. The one or more simulations may include the user/player interacting with one or more situational events encountered with the modeled business environment using user/player provided input data to thereby generate data related to simulation results. The situational events may include one or more of service desk calls, change requests, major outages, problem management, etc. The situational events may be related to IT.

At 422, the process flow 400 may include reviewing performance of the modeled business environment after one or more simulations via a user interface. For example, reviewing performance of the modeled business environment after one or more simulations may include reviewing key performance indicators (KPIs) and recommended improvements. Some examples of KPIs may include one or more of time related to entering incidents via templates, response time related to automatic routing of incidents, time related to resolve incidents, changes not approved, etc.

Figure 5:
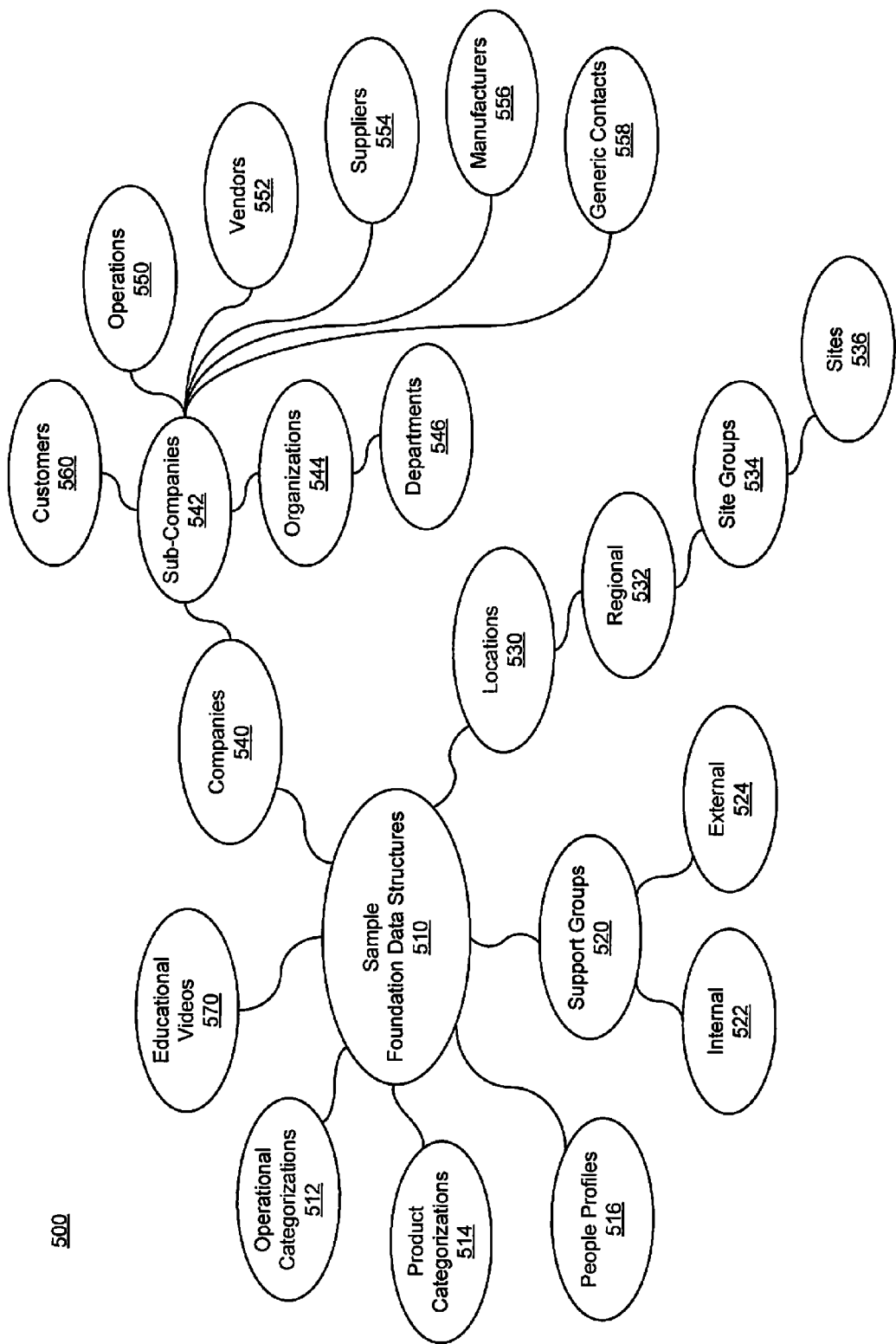
FIG. 5 is a diagram illustrating an example organizational structure for a modeled business environment, in accordance with aspects of the disclosure.

FIG. 5 is a diagram illustrating an example organizational structure 500 for a modeled business environment, in accordance with aspects of the disclosure. In various examples, the example organizational structure 500 may refer to sample foundation data structures 510 that define a business organization and one or more processes that may be associated with the business organization. The sample foundation data structures 510 may be linked or connected to various types of data related to one or more of operational categorizations 512, product categorizations 514, people profiles 516, support groups 520 (including internal and/or external support groups 522, 524), and locations 530 (including regional 532, site groups 534, and/or sites 536). The sample foundation data structures 510 may be linked or connected to various types of data related to companies 540 including sub-companies 542 associated with organizations 544 and/or departments 546. The sub-companies 542 may be associated with one or more of operations 550, vendors 552, suppliers 554, manufacturers 556, generic contacts 558, and customers 560. The sample foundation data structures 510 may be linked or connected to various types of data related to educational videos 570.

Figure 6:
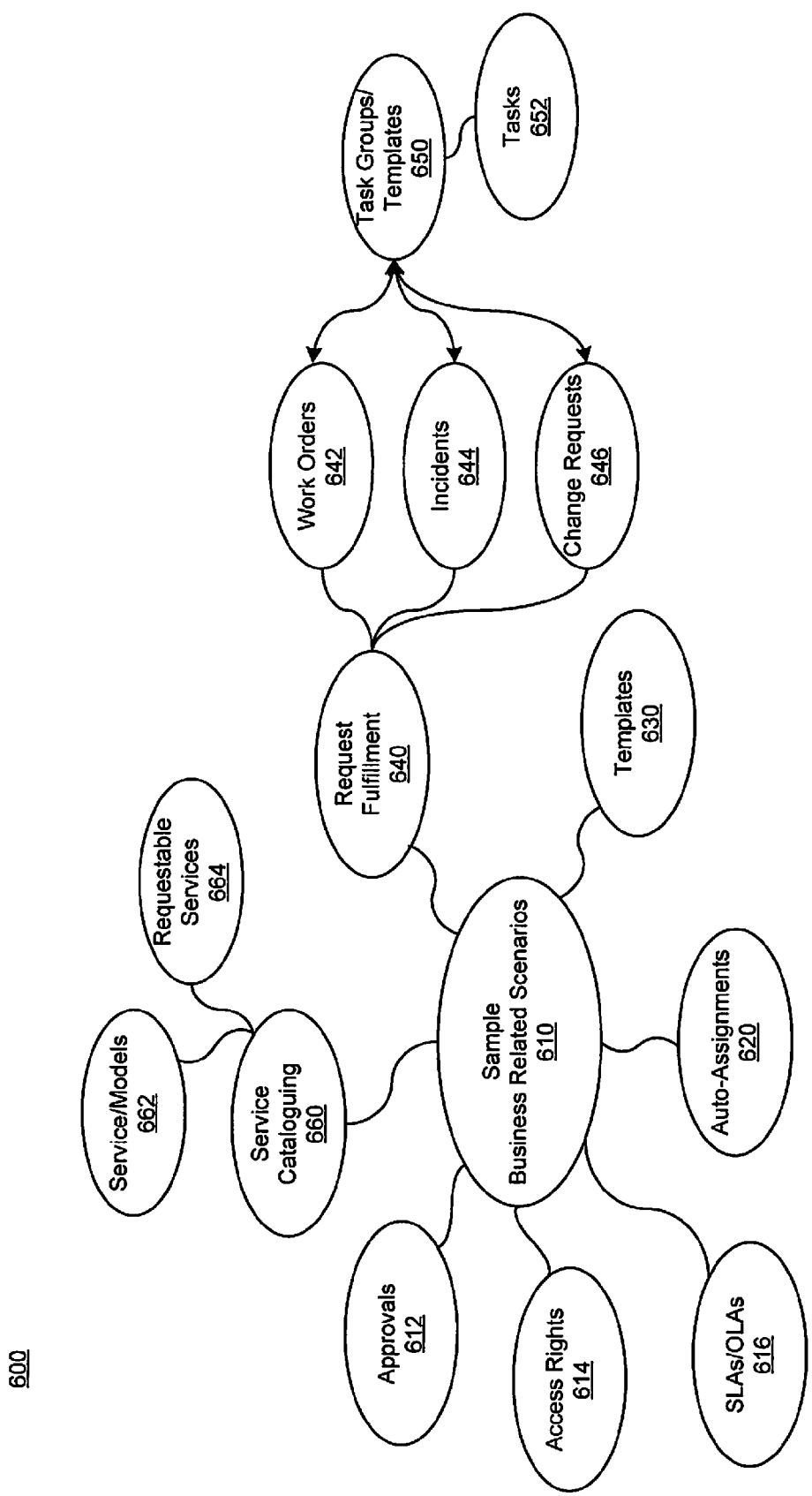
FIG. 6 is a diagram illustrating an example process environment for a modeled business environment, in accordance with aspects of the disclosure.

FIG. 6 is a diagram illustrating an example process environment 600 for a modeled business environment, in accordance with aspects of the disclosure. In various examples, the example process environment 600 may include processes associated with a business organization, and the process environment 600 may refer to one or more sample business related scenarios 610 associated with the modeled business environment. The sample business related scenarios 610 of the process environment 600 may be linked or connected to one or more of approvals 612, access rights 614, service level agreements (SLAs)/operational level agreements (OLAs) 616, auto-assignments 620, and templates 630. The sample business related scenarios 610 of the process environment 600 may be linked or connected to request fulfilment 640 including one or more of work orders 642, incidents 644, and change requests 646 that may be operating with task groups/templates 650 and/or tasks 652 associated therewith. The sample business related scenarios 610 of the process environment 600 may be linked or connected to service cataloguing 660 including service/models 662 and/or requestable services 664.

Figure 7:
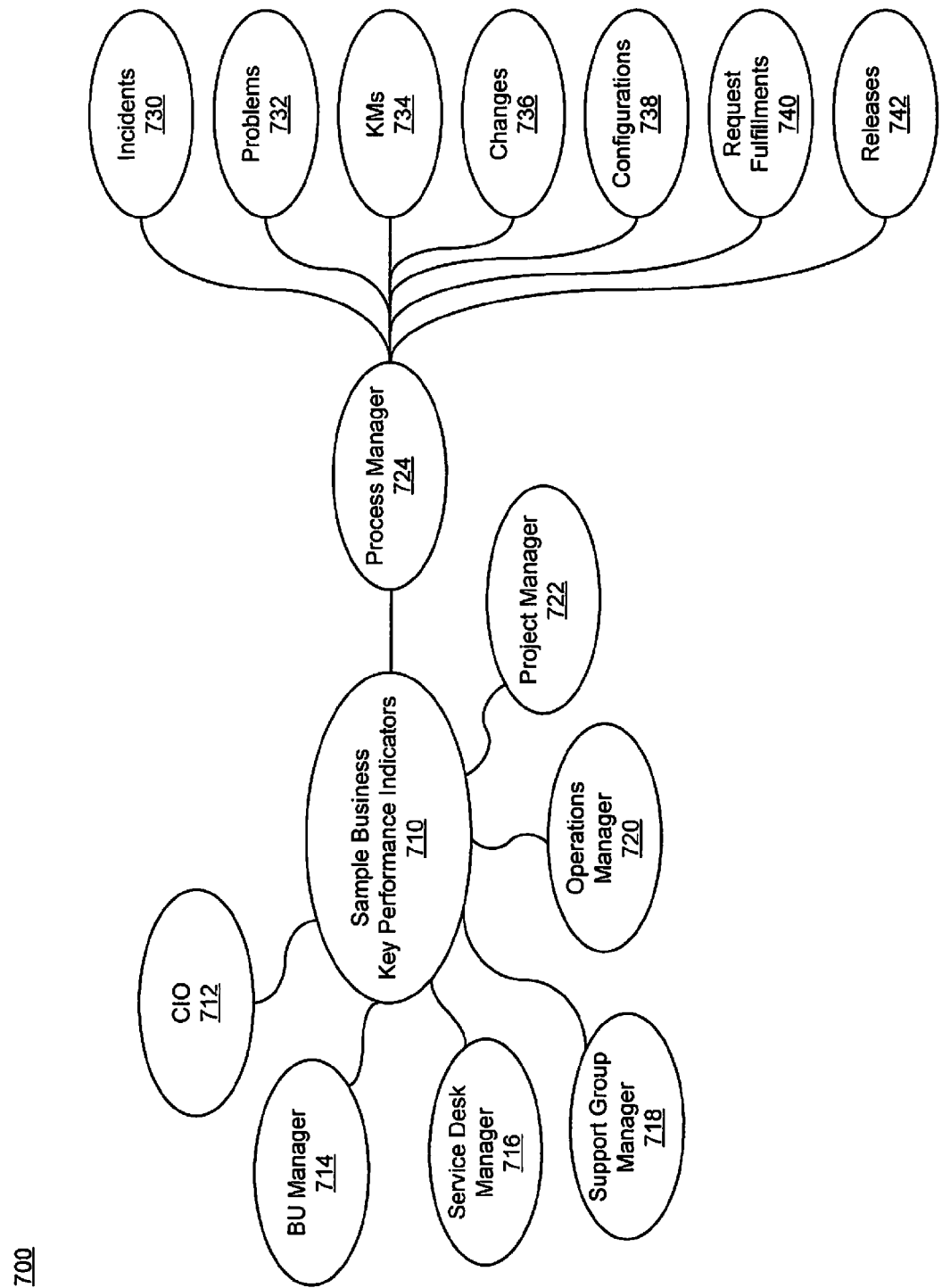
FIG. 7 is a diagram illustrating an example internal organizational structure for a modeled business environment, in accordance with aspects of the disclosure.

FIG. 7 is a diagram illustrating an example internal organizational structure 700 for a modeled business environment, in accordance with aspects of the disclosure. In various examples, the internal organizational structure 700 may be used to identify and/or determine a hierarchical (organizational) management structure for the modeled business environment along with identifying and/or determining various sample business key performance indicators (KPIs) 710 for the modeled business environment. The sample business KPIs 710 of the internal organizational structure 700 for the modeled business environment may be linked or connected to one or more of a chief information officer (CIO) 712, a business manager 714 (e.g., consumer of IT), a service desk manager 716, a support group manager 718, an operations manger 720, and a project manager 722. The sample business KPIs 710 of the internal organizational structure 700 for the modeled business environment may be linked or connected to a process manager 724 including one or more departments related to incidents 730, problems 732, knowledge management (KM) 734, changes 736, configurations 738, request fulfillments 740, and releases 742.

In accordance with aspects of the disclosure, user interactive simulation and online business simulation games may be used with a purpose to gather a team of people and let them together play the game in a step by step fashion to experience how a service they deliver may be approved by applying a structure in the organization and processes. Simulation may be used when teaching users/players including managers and/or others how to run an enterprise business. The system and methods disclosed herein may be configured to use simulation methodology in the form, for example, of an online game with a purpose to configure the SaaS offering, such as ready on-demand (RoD) as a mechanism for OnBoarding new customers or clients. The system and methods disclosed herein may be configured to analyze how RoD customers have implemented their RoD solutions and identifying patterns in the data to build and/or develop modeled business environments or companies.

In an implementation, the system and methods disclosed herein may be configured to mature and train customers or clients in how to organize their business organization (e.g., IT support organization). For instance, business development software may be provisioned with a functional set of data that through a simulation game may be adapted (i.e., adjusted, configured, reconfigured) to include the customer specific data, such as, for example, names of people, roles they have within the company, and which office they work from). Some advantages may include research and development cost reduction, reduce development time, possible higher client returns on investment, adding new layers that assist customers with optimizing their service organization, providing purchases in the game with an InApp to receive incremental revenue.

In an implementation, InApp purchases may refer to easy access of new and/or additional functionality for the business client. For instance, if simulation shows that the business client may achieve quick return from adding new functionality, then the business client may add the new functionality right away. In another instance, referring to a software vendor, InApp purchases may provide a new sales channel/tool, where the business client may play a simulation game while the simulation game shows how much business value may be gained by buying additional functionality. Further, the virtual consultant may be used by vendors to sell new features, and then the InApp purchasing features may allow the users/players to immediately get access to the new features and/or functionality. This may include features both in the adaptation engine itself, additional modeled business environments, and/or features in the business development software.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer (e.g., computer system, game console, smart television, etc.) having a display device, e.g., a cathode ray tube (CRT) or liquid crystal display (LCD) monitor, for displaying information to the user and a keyboard and a pointing device, e.g., a mouse or a trackball, by which the user may provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

Implementations may be implemented in a computing system configured for online simulation gaming to provide users/players with real-world interactive simulations to assist users/players with understanding complex business models including organizational structures, processes, and environments. Further, implementations may be implemented in a computing system configured to create online versions of simulation games accessible via a network and use gamification to construct the online simulation games so that, through simulation in an iterative fashion, the online simulation games may lead the users/players through collections of foundation data and configuration of any type of software including business development software.

Implementations may be implemented in various physical simulation devices, such as gaming systems, consoles, and devices having various types of input devices. Various other physical simulation devices may include simulators used to train pilots or space commanders where large physical engines and mechanical devices move a user's/player's body around simulation movements, speed, weight reduction, etc. Various other physical simulation devices may include 3D televisions and other devices where the user/player experiences simulation through wearable devices (e.g., glasses) to physically experience (e.g., watch) 3D objects on a two-dimensional (2D) screen and virtually feel part of the 3D world. Various other physical simulation devices may include a 3D theater where a 3D world may be projected in a physical room that allows the user/player to walk around in the 3D world projected in the physical room.

Implementations may be implemented in other technology areas including cloud based storage, memory, and computing capacity where various mobile computing and/or communication devices (e.g., smart-phones, tablets, PDAs, etc.) may be used as primary devices with location services, messaging, media, networking, and other social information technology (IT) environments. In various examples, the adaptation software described herein may be implemented in a socialized IT environment on a tablet device (or some other mobile computing/communication device or peer networked device) with backing services in a cloud based environment, rather than as a traditional two-tier client-server or web-based environment.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a processor and a memory forming a computing platform configured to provide, via a Uniform Resource Locator (URL), a Software as a Service (SaaS) offering and a simulation game to a remote business client, the SaaS offering including a business software product delivered on demand to the remote client, the simulation game operable as a mechanism to onboard a user to the business software product at the remote business client, and configured to onboard the user to the business software product at the remote business client by operating the simulation game to adapt the business software product to the remote business client using gamification and simulation in an iterative fashion; and
an adaptation engine configured to cause the processor to adapt the business software product for a modeled business environment based on simulation results of the simulation game generated by gaming one or more business related scenarios with scenario input data for the modeled business environment, the adaptation engine including
a simulation module configured to simulate the one or more business related scenarios for managing situational events encountered with the modeled business environment using the scenario input data to thereby generate the simulation results, and
an application module configured to apply the simulation results to the modeled business environment to refine the modeled business environment by adapting the business software product for the refined modeled business environment based on the simulation results; and
a gaming engine configured to iteratively present one or more of the simulated business related scenarios for the modeled business environment to the user on a user interface for iterative gaming actions using the business software product.

2. The online simulation game system of claim 1, wherein the business software product is configured for a physical business client associated with the modeled business environment.

3. The online simulation game system of claim 1, wherein the modeled business environment is configured to define a hierarchical management structure of one or more departments within a physical business client.

4. The online simulation game system of claim 1, wherein the modeled business environment is configured to define an internal organizational structure of a physical business client and is set to one or more process environments associated with the internal organizational structure of the physical business client.

5. The online simulation game system of claim 1, wherein the scenario input data includes one or more foundation data structures that are configured to define a business organization and one or more processes associated with the business organization.

6. The online simulation game system of claim 1, wherein the parameter related data specific to the business software product includes one or more of scripts, templates, and areas to explore in context of the modeled business environment.

7. The online simulation game system of claim 1, wherein the simulation module is further configured to interactively involve one or more users in the simulation by receiving user interactive input for each of the one or more users during simulation of the one or more business related scenarios.

8. The online simulation game system of claim 1, wherein the simulation module is further configured to simulate the one or more business related scenarios to discover areas within the modeled business environment that indicate a need for improvement.

9. The online simulation game system of claim 1, wherein the simulation module is further configured to measure one or more values of the parameter related data during simulation including measuring business related costs associated with the scenario input data.

10. The online simulation game system of claim 1, wherein managing situational events encountered with the modeled business environment includes managing one or more of problematic events, incident related events, personnel scheduling events, and job routing events that are inserted in the one or more business related scenarios for simulation.

11. The online simulation game system of claim 1, wherein the application module is further configured to resolve one or more problems associated with the modeled business environment discovered during simulation, the one or more problems including one or more discrepancies associated with at least one of the scenario input data and the simulation results.

12. The online simulation game system of claim 1, wherein the application module is further configured to identify patterns in the data related to the simulation results to refine the modeled business environment by reconfiguring the business software product for a physical business client associated with the modeled business environment.

13. The online simulation game system of claim 1, wherein the application module is further configured to refine the modeled business environment by updating one or more process environments associated with an internal structure of a physical business client associated with the modeled business environment.

14. The online simulation game system of claim 1, wherein the application module is further configured to refine the modeled business environment by using the data related to the simulation results to discover improvements to apply to the modeled business environment to thereby adjust the business development software for the refined modeled business environment.

15. The online simulation game system of claim 1, wherein the adaptation engine is further configured to cause the at least one processor to iteratively adapt the business software product for the modeled business environment based on simulation results generated by iteratively simulating a plurality of business related scenarios with the scenario input data and the data related to the simulation results for the modeled business environment.

16. A computer-implemented method, comprising:
providing, via a Uniform Resource Locator (URL), a Software as a Service (SaaS) offering and a simulation game to a remote business client, the SaaS offering including a business software product delivered on demand to the remote client, the simulation game operable as a mechanism to onboard a user to the business software product at the remote business client; and
onboarding the user to the business software product at the remote business client by operating the simulation game to adapt the business software product to the remote business client using gamification and simulation in an iterative fashion, wherein using the simulation includes iteratively simulating a plurality of business related scenarios of a modeled business environment for the business software product, and wherein onboarding the user includes adapting the business software product for the modeled business environment based on simulation results of the simulation game generated by gaming one or more business related scenarios with scenario input data for the modeled business environment, simulating the one or more business related scenarios for managing situational events encountered with the modeled business environment using the scenario input data to thereby generate the simulation results, applying the simulation results to the modeled business environment to refine the modeled business environment by adapting the business software product for the refined modeled business environment based on the simulation results, and presenting, iteratively, one or more of the simulated business related scenarios for the modeled business environment to the user on a user interface for iterative gaming actions using the business software product.

17. The method of claim 16, wherein:

the business software product is configured for a physical business client associated with the modeled business environment, the modeled business environment is configured to define a hierarchical management structure of one or more departments within the physical business client, and the modeled business environment is configured to define an internal organizational structure for one or more process environments associated with the physical business client.

18. The method of claim 16, wherein the scenario input data includes one or more foundation data structures that are configured to define a business organization and one or more processes associated with the business organization.

19. The method of claim 16, wherein the parameter related data specific to the business software product includes one or more of scripts, templates, and areas to explore in context of the modeled business environment.

20. A computer program product, the computer program product being tangibly embodied on a non-transitory computer-readable medium and comprising instructions that, when executed by at least one processor, are configured to:

provide, via a Uniform Resource Locator (URL), a Software as a Service (SaaS) offering and a simulation game to a remote business client, the SaaS offering including a business software product delivered on demand to the remote client, the simulation game operable as a mechanism to onboard a user to the business software product at the remote business client; and onboard the user to the business software product at the remote business client by operating the simulation game to adapt the business software product to the remote business client using gamification and simulation in an iterative fashion, wherein the simulation includes iterative simulations of a plurality of business related scenarios of a modeled business environment for the business software product, and wherein onboarding the user includes adapting the business software product for a modeled business environment based on simulation results generated by gaming one or more business related scenarios with scenario input data for the modeled business environment by acquiring the scenario input data from one or more sources, simulating the one or more business related scenarios for managing situational events encountered with the modeled business environment using the scenario input data to thereby generate the simulation results, applying the data related to the simulation results to the modeled business environment to refine the modeled business environment by adapting the business software product for the refined modeled business environment, and based on the simulation results and presenting, iteratively, one or more of the simulated business related scenarios for the modeled business environment to the user on a user interface for iterative gaming actions using the business software product.

* * * * *